United States Patent [19]

Dubois

[11] 4,094,686

[45] June 13, 1978

[54] ROAD-SURFACE ADDITIVE FOR PREVENTING ICE AND MELTING SNOW

[75] Inventor: Robert Dubois, La Croix, Lutry, Switzerland

[73] Assignee: Plastiroute S.A., Switzerland

[21] Appl. No.: 744,758

[22] Filed: Nov. 24, 1976

Related U.S. Application Data

[63] Continuation-in-part of Ser. No. 477,338, Jun. 7, 1974, Pat. No. 4,012,537.

[30] Foreign Application Priority Data

Nov. 25, 1975 Switzerland ................ 15242/75

[51] Int. Cl.² .............................................. C09K 3/18
[52] U.S. Cl. ..................................... 106/13; 106/253; 106/260; 106/266; 106/273 R; 106/280; 106/281 R; 252/70; 404/19; 404/20; 427/136; 427/138; 428/403; 428/404; 428/407
[58] Field of Search .............. 106/13, 273, 276, 253, 106/260, 266, 280, 281; 252/70; 404/19, 20; 427/136, 138; 428/403, 404, 407

[56] References Cited

U.S. PATENT DOCUMENTS

| | | | |
|---|---|---|---|
| 1,371,032 | 4/1919 | Kendrick | 252/70 |
| 2,648,603 | 8/1953 | Jenin et al. | 427/136 |
| 2,967,466 | 1/1961 | Shoemaker et al. | 427/138 X |
| 2,978,351 | 4/1961 | Pullar | 428/403 |
| 2,979,463 | 4/1961 | Ferguson | 252/70 |
| 3,240,558 | 3/1966 | Heiss et al. | 252/70 UX |
| 3,310,494 | 3/1967 | Sproule et al. | 252/70 |
| 3,461,073 | 8/1969 | Crowell et al. | 252/70 |
| 3,507,686 | 4/1970 | Hagenbach | 427/221 |
| 3,906,140 | 9/1975 | Capes | 252/70 |
| 4,012,537 | 3/1977 | Dubois | 427/138 |

FOREIGN PATENT DOCUMENTS

| | | | |
|---|---|---|---|
| 433,957 | 8/1935 | United Kingdom. | |
| 510,485 | 8/1939 | United Kingdom | 106/280 |

*Primary Examiner*—Joan E. Welcome
*Attorney, Agent, or Firm*—Robert E. Burns; Emmanuel J. Lobato; Bruce L. Adams

[57] ABSTRACT

An additive for admixture with road surface preparation materials to prevent formation of ice and to melt snow on the finished road surface. The additive is distributed throughout the road surface and comprises coated particles of a halide, e.g. calcium chloride, coated particles of an alkali metal hydroxide, e.g. sodium hydroxide and a trace of coated or uncoated particles of calcium hydride, the coatings being of a watertight inert substance such as linseed oil. These coatings are worn away at the road surface by traffic to expose the particles.

8 Claims, 3 Drawing Figures

ROAD-SURFACE ADDITIVE FOR PREVENTING ICE AND MELTING SNOW

RELATED APPLICATIONS

This application is a continuation-in-part of my copending application Ser. No. 477,338 filed June 7, 1974, now U.S. Pat. No. 4,012,537.

The invention relates to additives for incorporation in road surfaces to prevent the formation of ice and to melt snow on the road surfaces.

BACKGROUND

It is known that slippery ice occurs at temperatures between +2° and −8° C, according to the relative humidity of the air. The heaviest snow falls also occur in this temperature range. Below −8° C, the humidity of the air is too low for precipitation on the road surface and snow falls are scanty.

Heated road surfaces have already been used, in particular on bridges, for preventing the formation of ice and for melting snow, the heating being produced by electrical resistors embedded in the road surface or by means of embedded pipes through which hot water flows. Arrangements of this type are naturally quite expensive and require energy which has to be supplied externally.

It is also customary to spread hygroscopic salt, for example calcium or sodium chloride, on the road surface to lower the freezing point of water. However, the effect of spreading salt generally has a very short duration, since as vehicles pass by, they push the salt to the edge of the road and the water containing the salt drains away from the road.

The incorporation of a thawing agent in a road surface has already been proposed in British Patent Specification No. 433957, which previewed embedding particles of anhydrous magnesium chloride in a solid or plastic medium which allows only a gradual access of moisture to the thawing agent. This plastic medium, forming a binding agent, was preferably bitumen of the road surface, or alternatively wax, paraffin and the like. However tests carried out on this product in a sandwich road construction, reported in the publication Deutches Strassendienst (1958), showed that to achieve any effect, the road surface should have in excess of 50% by weight of magnesium chloride. During the first winter of testing the effect was poor and during the second winter there was no effect. The cost of building the road was increased by 50% and no way of improving the performance and longevity was found. Consequently, the idea was dismissed as being promising on paper, but not practical or economic.

THE INVENTION

According to the invention there is provided a road surface additive for incorporation in an asphalt or bituminous based road surface layer comprising a mixture of discrete particles of a halide and an alkali metal hydroxide in the ratio of 90 to 97 parts by weight of halide, preferably calcium chloride, for 3 to 10 parts of hydroxide, preferably sodium hydroxide, said particles having substantially water-tight coatings which are inert to the halide and hydroxide and heat resistant at temperatures to which the admixed additive may be subjected for formation of a road surface layer and which coatings can be mechanically destroyed to expose the particles at the surface of a road incorporating the additive to prevent ice formation and melt snow on said surface.

After incorporation in a road surface, the particles provided with a coating, for example of linseed oil, are substantially protected from the effect of moisture and thus from decomposition until the coating has been mechanically destroyed or worn away at the road surface. The mechanical action, by which the particles are exposed, is mainly produced by the normal abrasion of the road surface owing to traffic. Thus, only the particles appearing on the surface of the road lose their coating on the upper side due to abrasion, so that they are able to come into contact with the humidity of the air, rainwater or snow. Therefore, the particles originally located at a deeper point and which were hitherto protected, become successively effective in the same proportion as the thickness of the road surface is worn away, so that the ice-prevention and snowmelting effect is maintained throughout the entire life of the road surface at a practically uniform intensity.

The production of a material for use in the laying of a road surface layer is achieved simply by mixing the particles of the additive mixture with the basic material at the construction site in a percentage adapted to the given geographic and climatic situation. This is advantageous because from case to case it is possible to adapt the proportion of the additive in an optimum manner to the external conditions, which naturally depends on whether the road surface is laid on a bridge, in a section of woodland, in the mountains or on flat ground. Since, in most cases, for each section of road, one knows the average amounts of rain or snow to be expected seasonally and the temperatures as well as the permeability of the road covering used, the optimum proportion of additive may be calculated as a function of these conditions, as may the proportions of the components of the mixture. For example, one knows that the temperature dependent coefficients of diffusion for bitumen always have the order of magnitude of approximately $1 \times 10^{-8}$ grams per centimeter thickness, per cm$^2$ surface, per hour and for a pressure difference of 1mm mercury.

DETAILED DESCRIPTION

The ice prvention action of the halide, for example calcium chloride, resides in the fact that in solution each calcium ion attracts up to six molecules of water (H$_2$O) about it in order to lower the freezing point. With a saturated solution (35% CaCl$_2$), the freezing point is −45.6° C. In addition, heat is given off during the hydration, this heat given off increasing from 57 cal/g of CaCl$_2$ for a 5% concentration up to a maximum of 196 cal/g for a 20% concentration.

The ice-prevention action of the hydroxide, for example sodium hydroxide, is by different mode of action. As water crystallises to form ice, the adjacent molecules of H$_2$O become united by so-called "hydrogen bridges" or bonds to form tetrahydric crystals. In stable ice structure each oxygen atom is surrounded tetrahedrally by four other oxygen atoms and on each line of linkage between two oxygen atoms lies a hydrogen atom to form a hydrogen bridge; thus an oxygen atom is linked not only by covalence to two hydrogen atoms but also by the hydrogen bridges to two further hydrogen atoms. It has surprisingly proved that sodium hydroxide to a very high degree destroys or dislocates existing hydrogen bridges and impedes the formation of hydrogen bridges, i.e., to a special extent exerts in this way a thawing effect and impedes crystallization of water.

This happens because the hydrogen atom or the oxygen atom of an NaOH molecule is slid between the hydrogen atom of one water molecule and the oxygen atom of another water molecule and thus itself forms a bridge with the hydrogen atom or the oxygen atom of a water molecule, whereby the hydrogen bridges between water molecules are impeded or destroyed. It is sufficient for one individual NaOH molecule to disturb an ice crystal already in this way, for an imbalance to be generated which also affects the adjacent crystals and favours disintegration of the crystals.

Each NaOH molecule acts in this way on about 10 times more $H_2O$ molecules than does each $CaCl_2$ molecule. Further, it modifies the distance of adjacent oxygen atoms of the $H_2O$ molecules, preventing them from having the separation 2.76 A which is characteristic of ice crystals.

The NaOH also has an exothermic hydration. The heat thus released is relatively great for weak solutions (254.5 cal/g NaOH for a 5% solution, rising to a maximum of 256 for a 10% solution) then dropping progressively. The freezing point of an NaOH solution drops to $-27°$ for a 25% solution and then rises rapidly to $0°$ for a 30% solution and $+29°$ for a 40% solution.

Relatively small amounts of sodium hydroxide have thus been found to produce very strong thawing effects which were not to be expected to this extent. It is indeed generally known that in the presence of impurities crystallization is retarded, but the observed thawing effect of sodium hydroxide, due to the combined effect of hydratization and above all of the destruction or prevention of hydrogen bridges, substantially exceeded expectations. Moreover sodium hydroxide had never before hitherto been openly employed as a thawing substance, either embedded road surfaces or as spreading material, most probably from misgivings about its corrosive properties.

In addition, sodium hydroxide has been found to produce further important effects. The NaOH has an observed action on the $CaCl_2$ that tends to keep the freed $CaCl_2$ uniformly distributed on the road surface and tends to "transport" it along the road surface. This observation is unexplained, but is probably related to the fact that the NaOH maintains humidity. Roads incorporating the mixture in question have been found to remain practically permanently damp in winter conditions, and to remain damp in summer for longer periods than normal road surfaces. This has an unexpected advantageous result in that the freed mixture tends to adhere better to the road surface. $CaCl_2$ alone tends to be removed by automobile tires with the result that when the temperature drops, there is no longer a sufficient quantity to prevent ice formation.

With the mixture according to the invention, the road remains damp and the mixture clings to the road. When the temperature drops the damp mixture is already prepared, and keeps the freezing point below 0° C so that even in the case of rain, followed by a temperature drop, or by snow, the mixture is ready to prevent ice formation, and to thaw the snow.

This aspect is, of course, rather unexpected and surprising since heretofore one of the principles of ice prevention on roads has been to keep the roads as dry as possible to prevent ice formation, by the use of deliquescent materials such as $CaCl_2$.

The additive optionally comprises a very small amount of particles of a hydride such as $CaH_2$, which may have the same coatings as the other particles, or be uncoated. The action of the $CaH_2$ is not fully understood. It has been found to increase the performance of the coated roads, presumably by increasing interaction between the $CaCl_2$ and NaOH. $CaH_2$ also has the property, when cold, of dissociating water molecules, and this of course assists in lowering the freezing point.

The additive may consist of a mixture with approximately five parts by weight sodium hydroxide, approximately ninety five parts by weight calcium chloride and furthermore approximately 0.02 parts by weight calcium hydride; the hydroxide and chloride particles are provided with the aforesaid coatings, and the particles of calcium hydride, which promotes the dissociation of water even at low temperatures, may have the same coatings or may be uncoated.

The invention will now be further described, by way of example, with reference to the accompanying diagrammatic drawings, in which.

Figure 2:
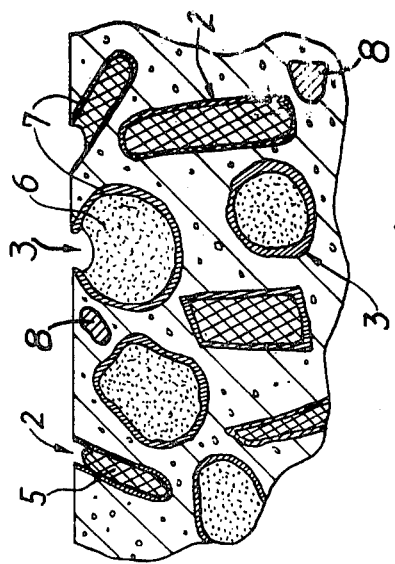
FIG. 2 shows a portion of FIG. 1 on an enlarged scale.
Figure 1:
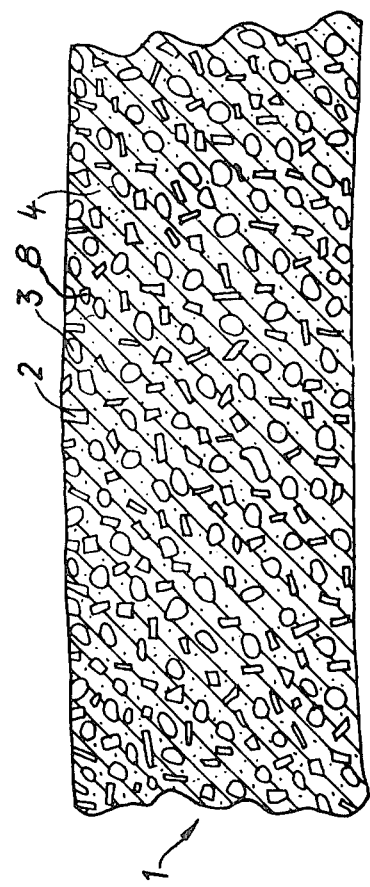
FIG. 1 is a vertical section through a portion of the upper layer of a road surface incorporating an additive according to the invention.

In the example according to FIGS. 1 and 2, the upper layer 1 of a road surface having an overall thickness of approximately 4 to 6 cm contains three types of individual particles 2, 3 and 8 distributed uniformly in a basic material 4, for example an asphalt/sand mixture. These individual particles 2, 3 and 8 are mixed into the basic material before the production of the road surface layer, preferably directly at the construction site, so that the finished mixed material may be laid in the normal manner and with conventional machines.

Each particle 2 of one type consists of a core of calcium chloride crystals 5 (FIG. 2) and a water-tight coating 7 of linseed oil, preferably boiled linseed oil, surrounding the core. Each particle 3 of the second type consists of a core of sodium hydroxide 6 and a water-tight coating 7 of linseed oil, preferably boiled linseed oil, surrounding the core. Each particle 8 of the third type consists of uncoated calcium hydride. All the particles are small in comparison to the thickness of the layer 1 and are either in the form of lozenges, flakes, beads or approximately spherical particles. The greatest dimension of the particles may be from 2 to 10 mm, whereas the diameter of the approximately spherical particles may amount to from 2 to 7 mm. In the example in question, the flake-like particles 2 have a length of approximately 5 mm and a width or thickness of approximately 1 mm.

According to the geographic and climatic situation prevailing on the section of road to be laid, the proportion of additive may amount to from 2 to 7% by weight of the basic material 4. The weight ratio of calcium chloride to sodium hydroxide in the particle mixture amounts, for example, to 15:1 to 24:1, whereas the proportion of calcium hydride with respect to the weight of the other substances forming the additive, is preferably from 0.015 to 0.03% by weight. All of the weights stated herein refer to the commercially-available product. Thus, the commercial calcium chloride has a concentration or purity of 77–80%, whereas commercial sodium hydroxide (caustic soda) is practically exempt of water and has a purity of 98–100%.

It is known that roads with a medium to high traffic density are normally subject to abrasion which reduces the thickness of the road surface by approximately 5 to 10 mm per year. Consequently, when the abrasion of the surface of layer 1 begins, in the case of a number of particles embedded in the upper surface, the coating 7 is opened due to abrasion on the upper side, as shown diagrammatically in FIG. 2, and the particle core comes into contact with the moisture contained in the air, or with rainwater or snow. The highly hygroscopic sodium hydroxide or caustic soda thus undergoes dissolution in a highly exothermic manner and begins to melt any snow falling in the immediate vicinity. The water also comes into contact with the calcium chloride, which is likewise highly hygroscopic, contained in the neighboring particle cores exposed by abrasion. The freezing point of the water is thus greatly reduced and water surfaces containing a great deal of salt begin to form around the small cavities in the road surface, in which calcium chloride crystal are contained. These water surfaces spread slowly over the entire road surface and effectively prevent any formation of slippery ice.

New particles which were originally located at a deeper level continually appear on the road surface and are made effective by the exposure of their cores, in the same proportion that the road surface is worn away by abrasion, so that the ice-prevention and snow melting capacity remains virtually constant throughout the entire life of the road surface.

Since the major part of the particles still located below the road surface are surrounded by substantially water-tight coatings 7 which are resistant with respect to the material of the cores, the cores of these particles embedded inside the road surface cannot be attacked or decomposed prematurely by moisture penetrating the road surface, so that their effectiveness is preserved until the abrasion of the road surface has reached a certain degree.

In addition the cavities formed due to abrasion of the particle coatings at the road surface and partial disintegration of the particle cores are very small and have quasi-capillary dimensions. Consequently, in the case of high temperatures which exclude the formation of snow or ice, i.e. particularly in summer, moisture or even heavy rain is prevented from quickly washing away the active particle cores, so that even the already-exposed cores on the road surface remain effective for a long time. Furthermore, the materials remaining in the cavities recrystallize as soon as the road dries, and are thus available for further reaction.

The choice of calcium chloride depends on economic considerations, but this salt also has excellent properties for the desired purpose, since it greatly reduces the freezing point of water, provides an exothermic reaction, is very hygroscopic and at the time of drying recrystallizes as a hydrate or mixed with water, and is effective even at very low temperatures. Sodium hydroxide is relatively expensive compared to conventional thawing agents: however as it is included in the additive in a relatively small proportion, this cost factor is not prohibitive in view of its properties, in particular with respect to its development of heat of reaction and its hygroscopic behaviour. In fact, the cost of sodium hydroxide is more than offset by its surprising effect. Furthermore, the chlorine ions liberated during the hydrolysis of the calcium react with the sodium ions, produced during the hydrolysis of the sodium hydroxide to form sodium chloride, which contributes to the reduction of the freezing point of water and absorbs the undesired free chlorine. Due to the choice of a mixture of calcium chloride particles and sodium hydroxide particles a particularly protracted and continuous ice prevention and snow melting effect is achieved.

This action is further increased by the addition of calcium hydride particles, since calcium hydride promotes the dissociation of water even at low temperatures.

Calcium bromide or calcium iodide or other suitable chlorides, bromides or iodides may in principle be used as the halide in place of the preferred calcium chloride, whereas other alkali metal hydroxides may be used in place of sodium hydroxide e.g. potassium hydroxide although this is more expensive. It is also possible to provide a mixture of different halides (for example calcium, magnesium and sodium chlorides) and a mixture of different alkali metal hydroxides such as sodium and potassium hydroxides.

The halide and hydroxide particles are coated to avoid premature hydrolysis or reaction of the particles still embedded inside the road surface under the action of moisture penetrating the road surface. This coating 7 is substantially water-tight and inert to the chemical substance of the particle core as well as resistant to heat at the temperature to which the mixed material is subjected for the formation of a road surface layer, i.e. prior to and during application as a road surface layer. This temperature may generally be 150° C as a maximum. A drying vegetable oil, in particular linseed oil, above all boiled linseed oil (so-called stand oil), has proved a particularly appropriate coating material; however, soya oil for example, may also be used.

Alternatively, suitable synthetic materials may also be used as coatings, for example materials based on a polymer of vinyl acetate, polyvinyl alcohol, epoxy resin or acrylic resin, or a suitable mineral oil derivative which does not attack the basic material. In principle, substances suitable as the coating material absorb little moisture and do not adhere after drying. According to the material, the thickness of the coating may be of the order of $10^{-3}$ to $10^{-1}$ mm. The particles may, if desired, be surrounded by an inner oil layer, for example linseed oil or boiled linseed oil, and also by an external synthetic coating. For this, the particle cores are firstly immersed in an oil bath and then in a bath of liquid synthetic material or are sprayed successively with oil and synthetic material.

Figure 3:
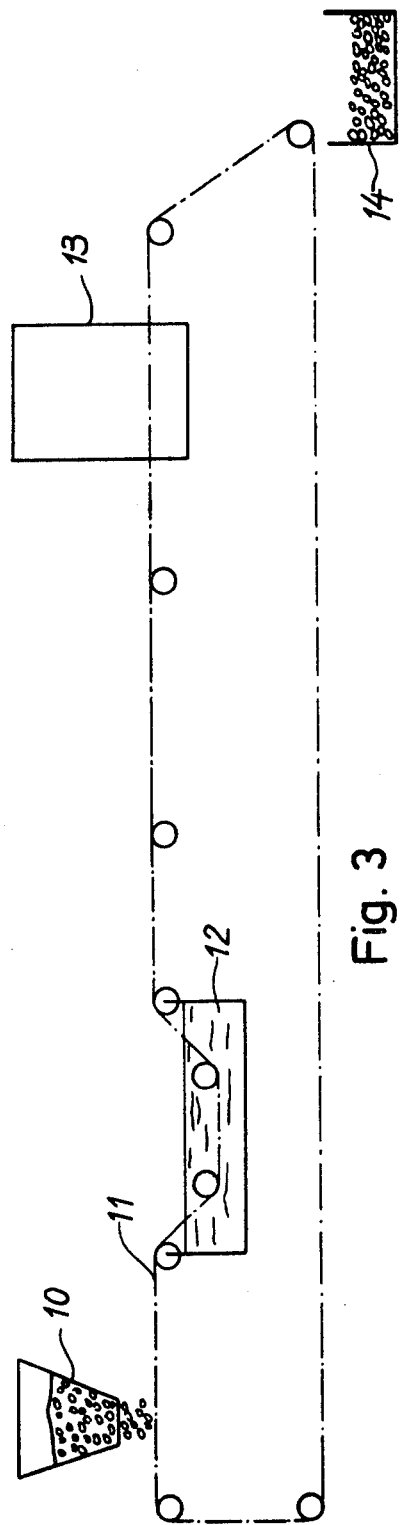
FIG. 3 is a diagram illustrating several operational stages during the production of the additive according to the invention.

FIG. 3 shows the preparation of the particles diagrammatically. For example, 94.5 to 95 parts by weight of calcium chloride crystals and 5 to 5.5 parts by weight sodium hydroxide particles are mixed in a storage vessel 10. A possible reaction between some particles to form sodium chloride and calcium hydroxide is of no significance. By way of a conveyor belt 11, which is perforated or constructed as a seive, the mixture of particles passes from the storage vessel 10 through an oil bath 12, for example of linseed oil. After leaving the bath, the oil is able to drip off the belt 11 which is preferably connected to a vibratory device, not shown, to accelerate the drainage of oil and improve the distribution of the particles on the belt surface. The thickness of the layer of oil generally amounts to only several microns. To accelerate drying of the oil coating, the conveyor belt 11 may then pass through a drying tunnel 13, which is provided with infra-red heating for example. However, a separate drying treatment of this type is not absolutely necessary. At the outlet of the drying tunnel 13, the particles coated with a layer of oil drop into a storage vessel 14 or mixer, in which they are uniformly mixed with calcium hydride powder. The proportion of calcium hydride may amount to 0.02 parts by weight per 100 parts by weight of the original calcium chloride and sodium hydroxide mixture. The entire preparation operation takes place with the least possible humidity.

Instead of being coated by immersion, the particles may be coated by spraying. For this purpose, the particles may be added to a mixer in the desired weight ratio, and then sprayed with the liquid coating material by means of nozzles or spray guns. The calcium hydride is then added in the desired amount.

Alternatively, the calcium hydride particles may be included in the initial mixture in vessel 10, and hence be coated simultaneously with the calcium chloride and sodium hydroxide particles.

EXAMPLE

An additive with which good results have been achieved was prepared as follows: 950 parts by weight of calcium chloride particles, 50 parts by weight of sodium hydroxide particles, 0.2 parts by weight of calcium hydride particles and 30 parts by weight of boiled linseed oil, so-called stand oil, were put into a mixer and thoroughly mixed so that practically all the particles were surrounded by a coating of linseed oil. If the parts by weight are kg, then the specified values yield an amount of 1030.2kg of additive.

The finished additive mixture, prepared with the illustrated installation or as set out in the Example, is then appropriately filled into suitable containers or bags and conveyed to the constructions site, where the additive is added to the basic material before production of the road surface. During the mixing of the additive in the basic material, a portion of particles may naturally be damaged or broken or the coating of a number of particles damaged. Likewise, during the laying of the mixed material, using conventional vibrators and rollers, the particles located on the surface may have their coatings partially broken or damaged so that a certain proportion of particles whose inner active core is not completely protected by the covering, is already located on the top of the newly laid road surface. This is in no way a disadvantage, but on the contrary is desirable, in order for the new road surface to have an immediate ice prevention and snow melting action. However, the major part of the particles embedded inside the road surface layer remains largely protected by the undamaged watertight coverings.

The total amount of additive used and its mixing ratio depends mainly on the type and density of traffic and on the climatic conditions at the location of the section of road to be laid and, since the permeability to water and the other properties of the road surface are known, may be assessed with regard to an optimum effect. Generally, the additive forms between 2 and 7% by weight as a percentage of the weight of the basic asphalt or bitumen based material, and preferably from 4 to 6%. Preferably, the layed road surface has a porosity of up to about 3% voids, to avoid excessive infiltration of water, this is achieved by rapidly compacting the surface with heavy rollers immediately after laying. This is immediately followed by thorough washing of the road surface to avoid initial slippyness, and a "running-in" period when speed restrictions are imposed, until the first substantial rainfall. Then, in normal use, wear of the road surface ensures that a quantity of the additive freed by abrasion, for example between 1.6 to 2.2 g/m2, remains permanently available on the road surface to prevent ice formation and melt snow. Such quantities have been found to be quite sufficient for this purpose, and are considerably less than the corresponding amount of salt which would have to be spread to melt ice or snow.

Instead of mixing the additive to the basic material at the road-laying site, mixing can be carried out at a preparation plant, and the heated mixture transported to the site by lorry. For example, using a mixer with a 1600 kg capacity, for production of one charge of the mixture of road-surfacing materials, one may use 1296 kg of gravel of different sizes (mineral component), 130 kg of rock dust as a filler (calcareous component), 94 kg of bitumen and 80 kg of the additive, these weights being quoted with a tolerance of plus or minus 5%. The mineral gravels consist, for example of: fine component ("0/4") 696 kg; medium components ("4/7") 220 kg and ("7/11") 260 k; and coarse component ("11/16") 120 kg.

Tests of road surface incorporating the described additive have given very good results.

Test No 1

The additive according to the Example was incorporated in the surface coating of a bridge and its access ramps having a total surface area of 37,000 m$^2$.

This bridge, in an exposed mountain area, had previously been subjected to salt spreading to prevent ice formation. Up to 80,000 kg of salt mixtures had been spread per year, and despite this on average 4 to 5 accidents were recorded each winter as a result of ice when salting had not been carried out in time. Further, the road surface had been very worn because of the use of salt, and the superstructure of the bridge so damaged that its expected life had been considerably reduced.

During the summer, the bridge was resurfaced with a layer formed of an asphalt/concrete base of 75 kg/m$^2$ incorporating 4.5% by weight of the additive for the major part of the surface, and 3.5% by weight of the additive for lanes of the access ramps reserved for heavy slow moving vehicles. This layer was relatively dense, containing only about 2.5 to 3% of voids.

After resurfacing, the bridge and access ramps remained ice free during two test winters without spreading salt. No accidents caused by ice were recorded. Wear of the road surface incorporating the additive was about the same as a comparable road surface without the additive.

No adverse effects (slipperyness) were recorded, although the surface noticeably remained damper than surfaces without the additive. Measurements carried out after three days continuous resin showed that the mixture was still present on the road surface in an amount sufficient to prevent ice formation (1 g/m$^2$ of the mixture).

Resurfacing with the additive, compared to the alternative of installing an electric heating system, enabled an estimated capital saving in excess of 2½million US dollars; and the costs of employing the additive, i.e. capital and maintenance expenditure, are estimated at 1/50 the costs of an electric system.

TEST NO. 2

The additive according to the Example was incorporated in the surface coating of a northerly-exposed three-lane highway in a mountainous region.

80 kg/m² of an asphalt-concrete road surfacing material containing 5% by weight of the additive were applied over a test section of 10,000 m² during early autumn.

During the winter, the test section of road remained ice-free, whereas the adjacent road sections were subject to icing and had to be regularly salted.

The central lane of the test section, which had a relatively low traffic density, was sometimes found to have a layer of frost, but never ice.

After snowfalls, a layer 3–4 cm thick adhered to the test section but rapidly become soft and was easy to clear away. On the adjacent road sections, the same layer of snow remained for several days and was more difficult to clear away.

TEST NO. 3

The additive according to the Example was incorporated in the surface coating of test sections occupying 10,000 m² of two bridges having a very high traffic density (20 to 25,000 vehicles per day) and located in a non-mountainous region. The surfaces contained 5 to 5.2% by weight of the additive.

In addition to being prone to ice, these road surfaces were subjected to relatively great wear. Consequently, a resistant surface was sough to reduce wear and accordingly the additive was incorporated in a fine asphalt-concrete having a void content of only 1.9% and a Marshall stability of 780.

The layer was applied at the end of autumn. Initially, the test sections were found to operate (i.e. prevent ice) at between 0° C and −3° C, but were inefficient below −3° C. After several weeks wear, the test sections were found to be completely effective in preventing ice.

In all of fifteen test road sections covering a total surface area of 150,000 m², these instances, illustrating the need for initial wear before the surface becomes fully effective to prevent ice, were the only reports of ineffectiveness of the surfaces.

These tests have not only confirmed the effectiveness of the ice prevention and snow thawing effects beyond all expectations, but have also revealed the great savings enabled by use of the additive, as well as beneficial side-effects, such as the reduction of corrosion, by elimination of the usual salt spreading. In effect, a road surface including the additive provides a permanent ice prevention and snow thawing action with release of only about 450 to 600 g of the thawing mixture, per year. This is considerably less than the 3 to 4 kg/m² per year of salts employed using the usual spreading technique when extreme conditions are encountered.

What is claimed is:

1. A road surface additive for incorporation in an asphalt or bituminous based road surface layer, comprising a mixture of discrete particles of a halide selected from the group consisting of calcium, magnesium and sodium chlorides and mixtures thereof and an alkali metal hydroxide selected from the group of sodium and potassium hydroxides in the ratio of 90 to 97 parts by weight of halide for 3 to 10 parts of hydroxide, said particles having substantially water-tight coatings which are inert to the halide and hydroxide and heat resistant at temperatures to which the admixed additive may be subjected for formation of a road surface layer and which coatings can be mechanically destroyed to expose said particles at the surface of a road incorporating the additive to prevent ice formation and melt snow on said surface.

2. A road surface additive as claimed in claim 1, in which the halide is calcium chloride.

3. A road surface additive as claimed in claim 2, in which the hydroxide is sodium hydroxide.

4. A road surface additive as claimed in claim 3, in which the mixture has 15 to 24 parts by weight of calcium chloride for 1 part of sodium hydroxide.

5. A road surface additive as claimed in claim 1, in which said coatings are formed of linseed oil.

6. A road surface additive as claimed in claim 1, further comprising 0.01 to 0.15 parts by weight of calcium hydride.

7. A road surface additive as claimed in claim 6, in which said particles of calcium hydride have the same substantially water-tight coatings as the particles of halide and hydroxide.

8. A road surface additive according to claim 6, comprising 94 to 96 parts by weight of calcium chloride, 4.5 to 5.5 parts by weight of sodium hydroxide, 0.015 to 0.03 parts by weight of calcium hydride, and 2.5 to 3.5 parts by weight of linseed oil forming said coatings.

* * * * *